(12) United States Patent
Hiratani et al.

(10) Patent No.: US 9,115,221 B2
(45) Date of Patent: Aug. 25, 2015

(54) METHOD FOR PRODUCING POLYMER PARTICLES

(71) Applicant: CANON KABUSHIKI KAISHA, Tokyo (JP)

(72) Inventors: Takayuki Hiratani, Tokyo (JP); Shinnosuke Koji, Yokohama (JP); Kazumichi Nakahama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/059,759

(22) Filed: Oct. 22, 2013

(65) Prior Publication Data

US 2014/0114036 A1    Apr. 24, 2014

(30) Foreign Application Priority Data

Oct. 24, 2012    (JP) ................ 2012-234905

(51) Int. Cl.
    *C08F 2/18*      (2006.01)
    *C08F 4/04*      (2006.01)
    *C08F 2/20*      (2006.01)

(52) U.S. Cl.
    CPC .... *C08F 4/04* (2013.01); *C08F 2/20* (2013.01)

(58) Field of Classification Search
    USPC ................ 526/219.5, 237, 238, 91, 95, 104
    See application file for complete search history.

(56) References Cited

U.S. PATENT DOCUMENTS

| | | | | |
|---|---|---|---|---|
| 4,055,713 | A * | 10/1977 | Moczygemba et al. | 526/207 |
| 5,274,057 | A * | 12/1993 | Georges et al. | 526/202 |
| 2005/0171312 | A1 * | 8/2005 | Lacroix-Desmazes et al. | 526/343 |
| 2012/0277390 | A1 * | 11/2012 | Hiratani et al. | 526/219.6 |
| 2012/0322965 | A1 * | 12/2012 | Koji et al. | 526/218.1 |

FOREIGN PATENT DOCUMENTS

| | | |
|---|---|---|
| JP | 09043909 A | 2/1997 |
| JP | 2006221203 A | 8/2006 |
| JP | 2012233147 A | 11/2012 |
| JP | 2012236967 A | 12/2012 |
| JP | 2013018953 A | 1/2013 |

OTHER PUBLICATIONS

Limer, A. et al., "Living radical polymerisation in heterogeneous conditions—suspension polymerisation", European Polymer Journal, (2005), pp. 805-816 vol. 41.

Tonnar, J. et al., "Controlled Radical Polymerization of Styrene by Reverse Iodine Transfer Polymerization (RITP) in Miniemulsion: Use of Hydrogen Peroxide as Oxidant", Macromolecules, (2007), pp. 186-190, vol. 40.

Biasutti, J. et al., "Reversible Addition-Fragmentation Chain Transfer Polymerization of Methyl Methacrylate in Suspension", Journal of Polymer Science: Part A: Polymer Chemistry, (2005) pp. 2001-2012, vol. 43.

Lacroix-Desmazes, P. et al., "Reverse Iodine Transfer Polymerization of Methyl Acrylate and n-Butyl Acrylate", Macromolecules, (2005), pp. 6299-6309, vol. 38.

* cited by examiner

*Primary Examiner* — Robert Harlan

(74) *Attorney, Agent, or Firm* — Canon USA Inc. IP Division

(57) ABSTRACT

A method for producing polymer particles includes a suspension step of suspending a first liquid mixture containing an oily olefin monomer and a radical polymerization initiator in a second liquid mixture containing water, an iodide ion, and an iodine molecule, to prepare a suspension in which an oil droplet containing the oily olefin monomer and the radical polymerization initiator is dispersed in the water containing the iodide ion and the iodine molecule, a synthesis step of synthesizing an iodine compound by allowing a radical generated by cleavage of the radical polymerization initiator to react with the iodine molecule in the oil droplet, and a polymerization step of polymerizing the oily olefin monomer in the oil droplet.

6 Claims, 6 Drawing Sheets

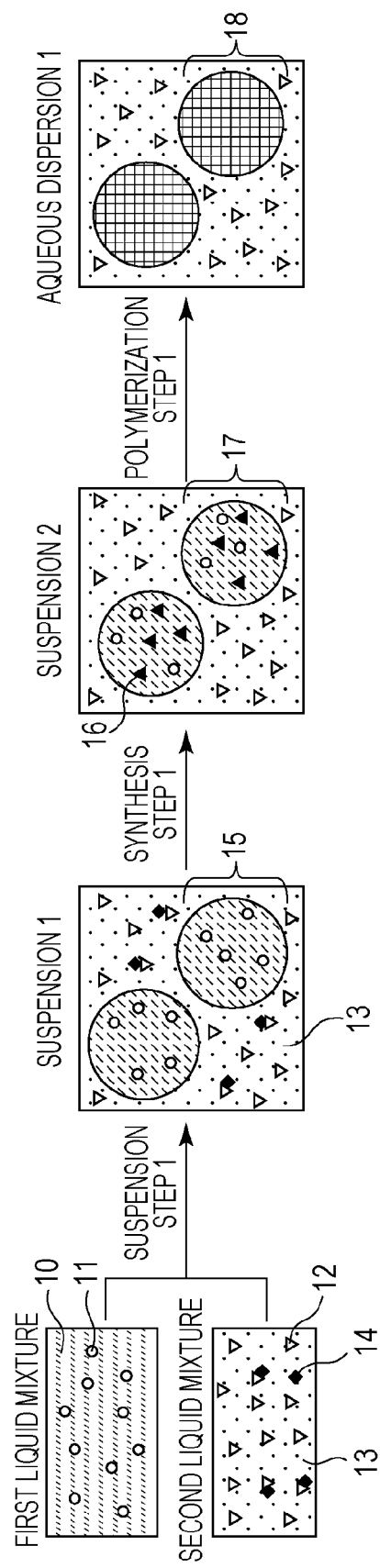

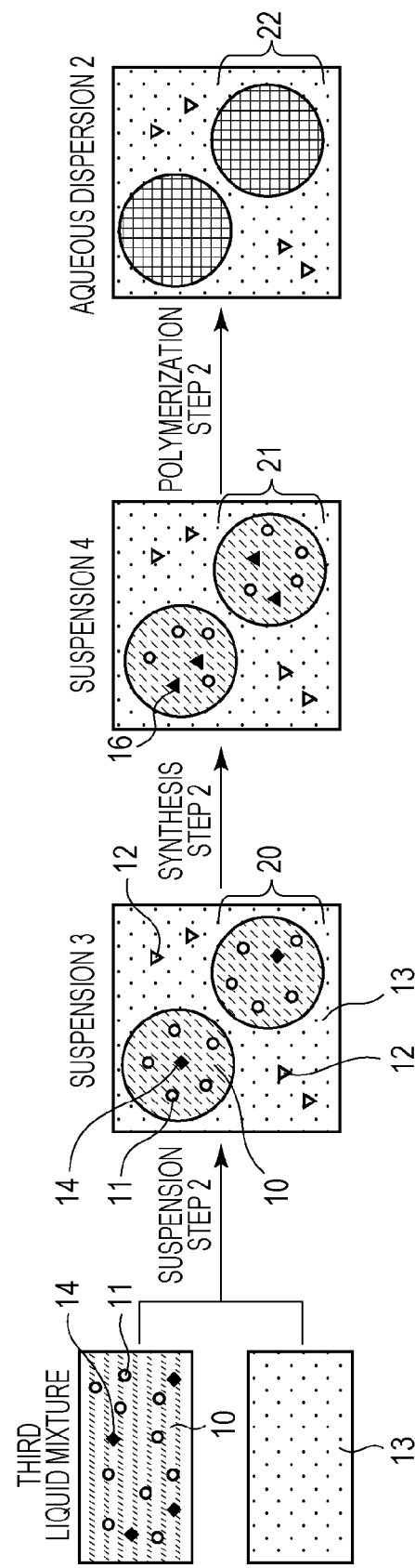

$V_1, V_2, V_3, V_4$: REACTION VELOCITY $V_5, V_6$: REACTION VELOCITY

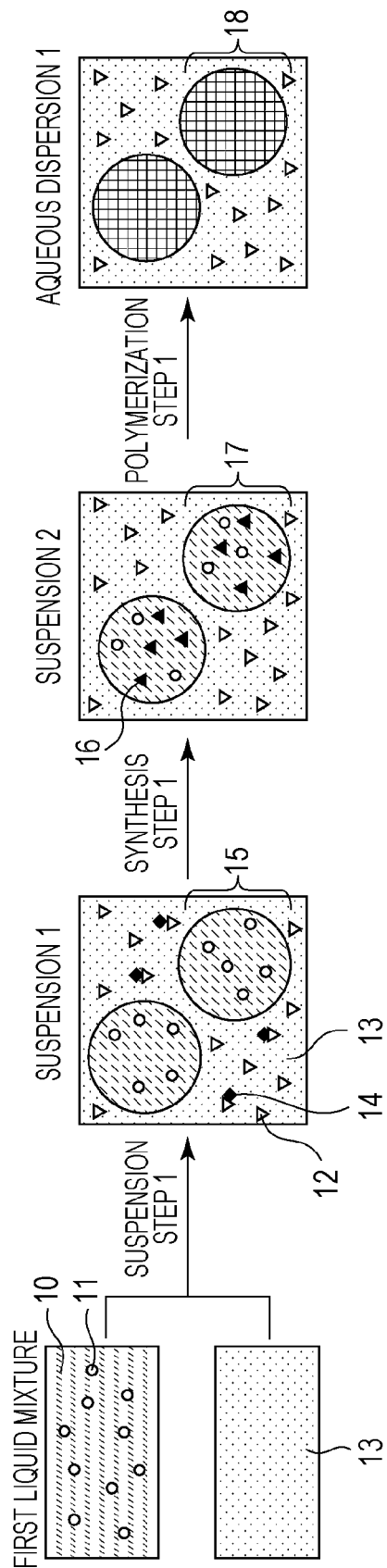

METHOD FOR PRODUCING POLYMER PARTICLES

BACKGROUND OF THE INVENTION

1. Field of the Invention

The present invention relates to a method for producing polymer particles.

2. Description of the Related Art

Polymer particles are produced by various polymerization methods such as suspension polymerization, emulsion polymerization, and precipitation polymerization. Among these polymerization methods, suspension polymerization is industrially widely used as, for example, a method for producing a polymerized toner because a functional substance such as a coloring material can be easily included in polymer particles.

Recently, the area of study regarding a technique for controlling the molecular weight of polymer particles has been activated. For example, Non-Patent Document 1 (Adam Limer, Alex Heming, Ian Shirley, and David Haddleton, European Polymer Journal, 2005, Vol. 41, pp. 805-816) and Non-Patent Document 2 (John D. Biasutti, Thomas P. Davis, Frank P. Lucien, and Johan P. A. Heuts, Journal of Polymer Science: Part A: Polymer Chemistry, 2005, Vol. 43, pp. 2001-2012) describe a method in which living radical polymerization such as atom transfer radical polymerization or reversible addition-fragmentation chain transfer polymerization is combined with suspension polymerization.

However, from the standpoint of problems of, for example, a remaining catalyst, safety and sanitation, and the cost, at present, it is difficult to industrially use many of such living radical polymerization methods.

As a method for industrially controlling the molecular weight of polymer particles, Patent Document 1 (Japanese Patent Laid-Open No. 09-043909) and Patent Document 2 (Japanese Patent Laid-Open No. 2006-221203) describe a method in which a polymerization control agent such as a chain transfer agent or a polymerization inhibitor is used. However, a significant difference in the molecular weight may be caused or the polymerization conversion rate may be significantly decreased depending on a slight difference in the amount of polymerization control agent used.

Although the molecular weight can also be controlled by changing the amount of polymerization initiator or the polymerization temperature, such a method has many problems in terms of the cost and safety for the purpose of obtaining polymer particles having a low molecular weight, for example.

As a method capable of easily controlling the molecular weight at a low cost, Non-Patent Document 3 (Patrick Lacroix-Desmazes, Romain Severac, and Bernard Boutevin, Macromolecules, 2005, Vol. 38, pp. 6299-6309) discloses reverse iodine transfer polymerization.

Furthermore, Non-Patent Document 4 (Jeff Tonner, Patrick Lacroix-Desmazes, and Bernard Boutevin, Macromolecules, 2007, Vol. 40, pp. 186-190) discloses that, in a process of producing polymer particles, the process being performed by using suspension polymerization and reverse iodine transfer polymerization in combination, good molecular-weight controllability and a good polymerization conversion rate can be achieved by adding hydrogen peroxide and hydrochloric acid to an aqueous phase.

The inventors of the present invention found that, in the case where reverse iodine transfer polymerization described in Non-Patent Document 3 is combined with suspension polymerization, iodide ions are produced by hydrolysis of iodine molecules, thereby particularly degrading molecular-weight controllability.

In the method disclosed in Non-Patent Document 4, oxygen produced by thermal decomposition of hydrogen peroxide inhibits a polymerization reaction, and therefore, the polymerization conversion rate is fundamentally insufficient. Furthermore, since this method is suspension polymerization under a strongly acidic condition, dispersion stability of polymer particles may be impaired.

SUMMARY OF THE INVENTION

Aspects of the present invention provide a method for producing polymer particles, the method being performed by using suspension polymerization and reverse iodine transfer polymerization in combination, in which both good molecular-weight controllability and a good polymerization conversion rate can be achieved.

A method for producing polymer particles according to a first aspect of the present invention includes a suspension step of suspending a first liquid mixture containing an oily olefin monomer and a radical polymerization initiator in a second liquid mixture containing water, an iodide ion, and an iodine molecule, to prepare a suspension in which an oil droplet containing the oily olefin monomer and the radical polymerization initiator is dispersed in the water containing the iodide ion and the iodine molecule; a synthesis step of synthesizing an iodine compound by allowing a radical generated by cleavage of the radical polymerization initiator to react with the iodine molecule in the oil droplet; and a polymerization step of polymerizing the oily olefin monomer in the oil droplet.

A method for producing polymer particles according to a second aspect of the present invention includes a suspension step of suspending a first liquid mixture containing an oily olefin monomer and a radical polymerization initiator in water, and subsequently adding an iodide ion and an iodine molecule to the water, to prepare a suspension in which an oil droplet containing the oily olefin monomer and the radical polymerization initiator is dispersed in the water containing the iodide ion and the iodine molecule; a synthesis step of synthesizing an iodine compound by allowing a radical generated by cleavage of the radical polymerization initiator to react with the iodine molecule in the oil droplet; and a polymerization step of polymerizing the oily olefin monomer in the oil droplet.

Further features of the present invention will become apparent from the following description of exemplary embodiments with reference to the attached drawings.

BRIEF DESCRIPTION OF THE DRAWINGS

FIG. 2 is a process drawing illustrating a method for producing polymer particles according to an embodiment of the present invention.

FIG. 3 is a process drawing illustrating a method for producing polymer particles in the related art.

FIG. 6 is a process drawing illustrating a method for producing polymer particles according to another embodiment of the present invention.

DESCRIPTION OF THE EMBODIMENTS

The present invention will now be described in detail.

[First Method for Producing Polymer Particles]

A first method for producing polymer particles according to an embodiment of the present invention includes a suspension step of suspending a first liquid mixture containing an oily olefin monomer and a radical polymerization initiator in a second liquid mixture containing water, an iodide ion, and an iodine molecule to prepare a suspension in which an oil droplet containing the oily olefin monomer and the radical polymerization initiator is dispersed in the water containing the iodide ion and the iodine molecule; a synthesis step of synthesizing an iodine compound by allowing a radical generated by cleavage of the radical polymerization initiator to react with the iodine molecule in the oil droplet; and a polymerization step of polymerizing the oily olefin monomer in the oil droplet.

The method for producing polymer particles according to an embodiment of the present invention is performed using reverse iodine transfer polymerization. First, reverse iodine transfer polymerization will be described.

Figure 1:
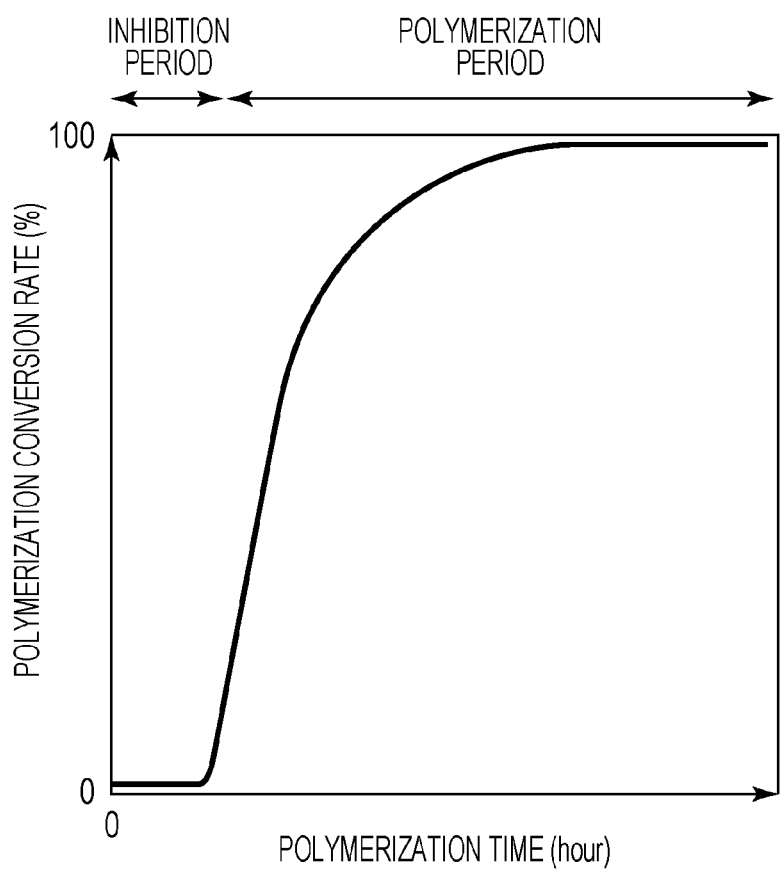
FIG. 1 is a graph that schematically shows a typical relationship between the polymerization conversion rate and the polymerization time in reverse iodine transfer polymerization.

Reverse iodine transfer polymerization is living radical polymerization characterized by using iodine molecules (chemical formula: $I_2$) as described in Non-Patent Document 3. FIG. 1 schematically shows a typical relationship between the polymerization conversion rate and the polymerization time in reverse iodine transfer polymerization.

A polymerization reaction in reverse iodine transfer polymerization is divided into an inhibition period induced in the initial stage of the polymerization reaction and a polymerization period induced in the middle and late stages of the polymerization reaction. In the inhibition period, an iodine compound is produced by a reaction between a radical generated by cleavage of a radical polymerization initiator and an iodine molecule. In the polymerization period, a polymer compound is produced by a chain reaction of a monomer with intervention of the iodine compound and the radical polymerization initiator.

As shown in FIG. 1, reverse iodine transfer polymerization is characterized in that the polymerization conversion rate hardly changes during the inhibition period, and increases during the polymerization period with the increase in the polymerization time.

The molecular weight of a polymer compound obtained by ideal reverse iodine transfer polymerization (in the case where the polymerization conversion rate is 100%) depends on the amount of iodine molecules charged as represented by formula (1):

(Molecular weight)=[(Weight of monomer charged)/{2×(The number of iodine molecules charged)}]+(Mass number of residue of radical polymerization initiator)+(Mass number of iodine atom)  Formula (1)

The term "molecular weight of a polymer compound" and the term "molecular weight of polymer particles" used herein represent the same concept.

Next, a problem of a method for producing polymer particles, the method being performed by using reverse iodine transfer polymerization and suspension polymerization in combination, will now be described with reference to FIG. 3.

FIG. 3 is a process drawing illustrating a method for producing polymer particles in the related art. In FIG. 3, a third liquid mixture containing an oily olefin monomer 10, a radical polymerization initiator 11, and iodine molecules 14 is suspended in water 13 in a suspension step 2, thereby obtaining a suspension 3 in which oil droplets 20 containing the oily olefin monomer 10, the radical polymerization initiator 11, and the iodine molecules 14 are dispersed in the water 13.

Next, in a synthesis step 2, the inhibition period of reverse iodine transfer polymerization occurs in the oil droplets 20, and radicals generated by cleavage of the radical polymerization initiator 11 and the iodine molecules 14 react with each other to produce an iodine compound 16, thus obtaining a suspension 4 in which oil droplets 21 containing the iodine compound 16 are dispersed in the water 13.

Lastly, in a polymerization step 2, the polymerization period of reverse iodine transfer polymerization occurs in the oil droplets 21 to obtain an aqueous dispersion 2 in which polymer particles 22 are dispersed in the water 13. For the sake of convenience of description, the synthesis step 2 (inhibition period) and the polymerization step 2 (polymerization period) have been separately described. However, these steps are a continuous step in the actual experimental operation.

The inventors of the present invention believe that, in the method for producing polymer particles, the method being performed by using reverse iodine transfer polymerization and suspension polymerization in combination, the essence of the problem occurs mainly in the suspension step 2 in FIG. 3. Originally, the solubility of the iodine molecules 14 in the water 13 is relatively low (solubility (25° C.): 0.34 g/100 g of water).

However, the iodine molecules 14 dissolved in the water 13 through the interface between the oil droplets 20 and the water 13 are hydrolyzed by a large amount of water 13 present around the iodine molecules 14 and converted to iodide ions 12 (chemical formula: $I^-$).

Specifically, the essence of the problem lies in that, when the third liquid mixture is suspended in the water 13 in the suspension step 2 to obtain the suspension 3 in which the oil droplets 20 containing the oily olefin monomer 10, the radical polymerization initiator 11, and the iodine molecules 14 are dispersed in the water 13, some of the iodine molecules 14 are hydrolyzed, thereby irreversibly generating iodide ions 12 in the water 13.

Referring to formula (1), the molecular weight in reverse iodine transfer polymerization depends on the amount of iodine molecules charged. Therefore, the irreversible generation of the iodide ions 12 due to hydrolysis of the iodine molecules 14 in FIG. 3 inevitably degrades the molecular-weight controllability.

Next, a method for producing polymer particles according to an embodiment of the present invention will be described. According to the method for producing polymer particles according to an embodiment of the present invention, the problem in the related art illustrated in FIG. 3 can be solved.

FIG. 2 is a process drawing illustrating the first method for producing polymer particles according to an embodiment of the present invention. Referring to FIG. 2, in a suspension step 1, a first liquid mixture containing an oily olefin monomer 10 and a radical polymerization initiator 11 is suspended in a second liquid mixture containing water 13, iodide ions 12, and iodine molecules 14, thereby obtaining a suspension 1 in which oil droplets 15 containing the oily olefin monomer 10 and the radical polymerization initiator 11 are dispersed in the water 13 containing the iodide ions 12 and the iodine molecules 14.

As described above, the iodine molecules 14 alone have a low solubility in the water 13. However, under the condition that the iodide ions 12 coexist as in the second liquid mixture, a large amount of iodine molecules are made soluble in the water 13.

Next, in a synthesis step 1, the inhibition period of reverse iodine transfer polymerization occurs in the oil droplets 15, and radicals generated by cleavage of the radical polymerization initiator 11 and the iodine molecules 14 react with each other to produce an iodine compound 16, thus obtaining a suspension 2 in which oil droplets 17 containing the iodine compound 16 are dispersed in the water 13.

Lastly, in a polymerization step 1, the polymerization period of reverse iodine transfer polymerization occurs in the oil droplets 17, and the oily olefin monomer 10 is polymerized, thereby obtaining an aqueous dispersion 1 in which polymer particles 18 are dispersed in the water 13. For the sake of convenience of description, the synthesis step 1 (inhibition period) and the polymerization step 1 (polymerization period) have been separately described. However, these steps are a continuous step in the actual experimental operation.

A feature of the method for producing polymer particles according to an embodiment of the present invention lies in that, in the suspension step 1, the iodide ions 12 and the iodine molecules 14 are contained in the second liquid mixture. The presence of the iodide ions 12 contained in the second liquid mixture can suppress hydrolysis of the iodine molecules 14 in the water 13.

Figure 4A:
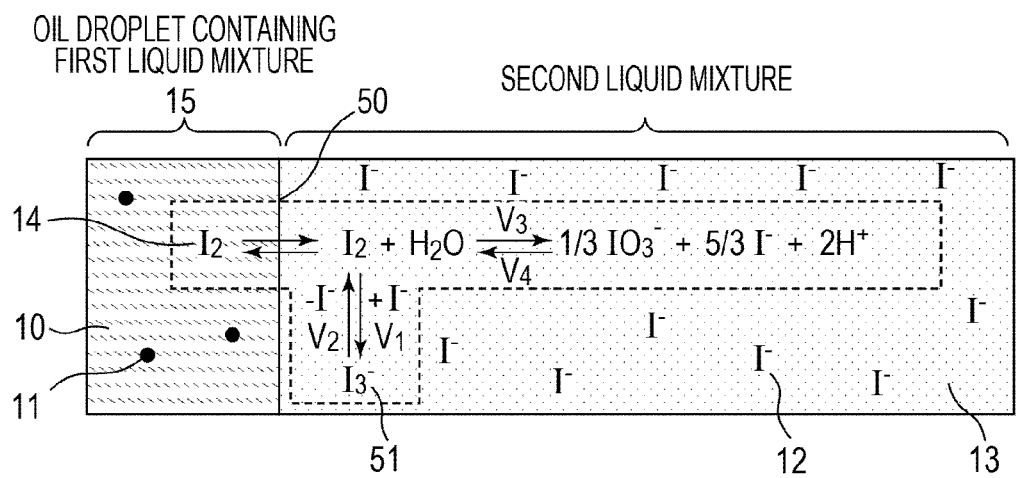
FIG. 4A is a drawing illustrating a mechanism for suppressing hydrolysis of an iodine molecule according to an embodiment of the present invention.
Figure 4B:
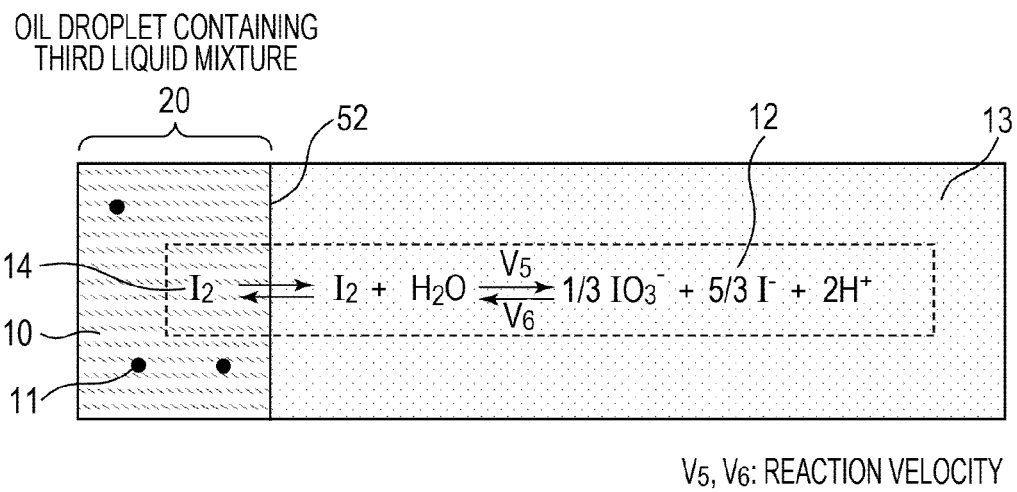
FIG. 4B is a drawing illustrating a mechanism of hydrolysis of an iodine molecule in the related art.

This effect will be described with reference to FIGS. 4A and 4B. FIGS. 4A and 4B are drawings for explaining a mechanism for suppressing hydrolysis of an iodine molecule. FIG. 4A illustrates a mechanism for suppressing hydrolysis of an iodine molecule according to an embodiment of the present invention. FIG. 4B illustrates a mechanism of hydrolysis of an iodine molecule in the related art.

In the related art illustrated in FIG. 4B, as described above, an iodine molecule 14 dissolved in water 13 through an interface 52 between an oil droplet 20 and the water 13 is hydrolyzed by a large amount of water 13 present around the iodine molecule 14 to generate an iodide ion 12.

The amount of iodide ion 12 generated in this case is extremely smaller than the amount of water 13. Therefore, a velocity $v_5$ of the hydrolysis reaction of the iodine molecule 14 is higher than a velocity $v_6$ of the reverse reaction thereof ($v_5 > v_6$).

Consequently, under the condition that the amount of hydrolysis reaction product of the iodine molecule 14, such as the iodide ion 12, is extremely smaller than the amount of water 13, iodine molecules 14 are hydrolyzed in the water 13, and thus iodide ions 12 continue to be generated.

In addition, $IO_3^-$, which is also the hydrolysis reaction product similar to an iodide ion, has high activity and is unstable. Therefore, the hydrolysis reaction irreversibly proceeds.

Accordingly, as represented by formula (1), the molecular weight in reverse iodine transfer polymerization depends on the amount of iodine molecules charged, and thus the above-described hydrolysis of iodine molecules 14 causes a significant problem in achieving good molecular-weight controllability.

Furthermore, it is also concerned that dispersion stability of the suspension may be impaired by a hydrogen ion ($H^+$) generated together with the iodide ion 12 in the hydrolysis reaction of the iodine molecule 14.

Furthermore, since most of the iodine molecules 14 are contained in the oil droplets 20, addition of a functional substance having reactivity with the iodine molecules 14 to the oil droplets 20 inhibits the polymerization.

In contrast, in an embodiment of the present invention, as illustrated in FIG. 4A, in the second liquid mixture, a triiodide ion (chemical formula: $I_3^-$) 51 is produced on the basis of an equilibrium reaction (equilibrium constant $K \approx 10^3$ (25° C.)) between an iodine molecule 14 and an iodide ion 12, thereby suppressing the hydrolysis reaction of the iodine molecule 14.

Specifically, a reaction in which a triiodide ion 51 is produced from an iodine molecule 14 preferentially occurs ($v_1$, $v_2 \gg v_3$, $v_4$), thus significantly decreasing the amount of iodine molecule 14 present in the second liquid mixture. Therefore, the hydrolysis reaction of the iodine molecule 14 is suppressed.

The triiodide ion 51 has a high resistance to the hydrolysis reaction, and can reversibly generate an iodine molecule 14 on the basis of the equilibrium reaction.

Accordingly, in the synthesis step 1 of an embodiment of the present invention, with the consumption of an iodine molecule 14 by the reaction with a radical in an oil droplet 15, an iodine molecule is sequentially supplied from a triiodide ion 51 in water 13 to the oil droplet 15 through an interface 50. Thus, good molecular-weight controllability can be achieved.

Furthermore, the effect of suppressing a hydrolysis reaction is obtained by incorporating an iodide ion 12, which is a hydrolysis reaction product, in water in advance. It is believed that this effect also contributes to the good molecular-weight controllability.

Accordingly, the method for producing polymer particles according to an embodiment of the present invention can realize good molecular-weight controllability.

[First Liquid Mixture]

The first liquid mixture according to an embodiment of the present invention is a liquid containing at least an oily olefin monomer and a radical polymerization initiator. The first liquid mixture may further contain oily organic solvents as an auxiliary agent that promotes compatibilization.

In particular, in the case where the oily olefin monomer is solid at room temperature, oily organic solvents may be used in combination. Examples of the oily organic solvents used include, but are not limited to, common oily organic solvents such as toluene, benzene, chloroform, and ethyl acetate. Two or more oily organic solvents may be used in combination.

The first liquid mixture may contain functional substances in addition to an oily olefin monomer and a radical polymerization initiator.

Examples of the functional substance include imide compounds such as N-iodosuccinimide, succinimide, maleimide, and phthalic imide; aromatic amine compounds such as diphenylamine; and phosphorous acid compounds such as diethyl phosphite. The group of these compounds functions as a polymerization catalyst in reverse iodine transfer polymerization and thus contributes to an improvement in the rate of polymerization.

The first liquid mixture may contain, as a functional substance, a hydrophobe (cosurfactant) soluble in the first liquid mixture and having solubility in water of 0.01 g/L or less. The use of the hydrophobe stabilizes a suspension, and this is advantageous in that very small oil droplets can be formed in a suspension step described below. Specific examples of the hydrophobe include a group of compounds such as (a) C8 to C30 linear-chain, branched-chain, or cyclic alkanes, e.g., hexadecane, squalane, and cyclooctane; (b) C8 to C30 alkyl (meth)acrylates, e.g., stearyl methacrylate and dodecyl methacrylate; (c) C8 to C30 alkyl alcohols, e.g., cetyl alcohol; (d) C8 to C30 alkylthiols, e.g., dodecyl mercaptan; (e) polymers, e.g., polyurethane, polyester, and polystyrene; and (f) long-chain aliphatic or aromatic carboxylic acids, long-chain aliphatic or aromatic carboxylic acid esters, long-chain aliphatic or aromatic amines, ketones, halogenated alkanes, silanes, siloxanes, and isocyanates.

The functional substance is not limited to the above substances, and two or more functional substances may be used in combination.

[Oily Olefin Monomer]

The oily olefin monomer used in an embodiment of the present invention is a monomer that is substantially immiscible with water and that forms an interface when mixed with water. The solubility of the oily olefin monomer in water may be 3% (3 g of the oily olefin monomer relative to 100 g of water) or less at room temperature (20° C.) When this condition is satisfied, a suspension can be satisfactorily formed in the suspension step. In addition, the oily olefin monomer used in an embodiment of the present invention is a radical polymerizable olefin monomer that can be polymerized by cleavage of a radical polymerization initiator.

Polymerizable unsaturated aromatic monomers and polymerizable carboxylic acid esters may be used as the oily olefin monomer in an embodiment of the present invention from the standpoint of compatibility with organic solvents, stability of a suspension, controllability of a polymerization reaction, etc. Specific examples of the oily olefin monomer include, but are not limited to, styrene, chlorostyrene, α-methyl styrene, divinylbenzene, vinyltoluene, methyl(meth)acrylate, ethyl (meth)acrylate, and butyl(meth)acrylate. These oily olefin monomers may be used alone. Alternatively, a plurality of oily olefin monomers may be mixed to form a copolymer, as required. Alternatively, a plurality of oily olefin monomers may be sequentially added to form a gradient copolymer or a block copolymer. In particular, in order to obtain polymer particles containing a block copolymer, the polymerization step may be conducted in multiple stages. For example, polymer particles containing a block copolymer are obtained by conducting a first polymerization step using a single oily olefin monomer, then charging another oily olefin monomer in the resulting suspension, and conducting a second polymerization step.

[Radical Polymerization Initiator]

Known radical polymerization initiators can be used in an embodiment of the present invention. Among known radical polymerization initiators, oil-soluble radical polymerization initiators that have solubility in water at 20° C. of 10% by weight or less and that are soluble in the oily olefin monomer at reaction temperatures in the synthesis step and the polymerization step may be used. In order to achieve a good polymerization conversion rate, the redox potential of the radical polymerization initiator according to an embodiment of the present invention may be lower than the redox potential (0.54 V vs. SHE) of $I_2/I^-$ (iodine molecule/iodide ion). This is because, in the case where the redox potential of the radical polymerization initiator is lower than the redox potential of $I_2/I^-$ (iodine molecule/iodide ion), it is possible to suppress an unintended decomposition reaction of the radical polymerization initiator, the decomposition reaction being caused by the reduction of the radical polymerization initiator by iodide ions. Whether or not the redox potential of the radical polymerization initiator is lower than the redox potential of $I_2/I^-$ (iodine molecule/iodide ion) can be verified by the following method. Specifically, a saturated aqueous solution of potassium iodide is added dropwise to a solution containing a radical polymerization initiator, e.g., an N,N-dimethylformamide solution containing a radical polymerization initiator, and the change in the color of the resulting solution is observed. In the case where the color of the solution changes to yellow or brown and thus the generation of iodine molecules is confirmed, the redox potential of the radical polymerization initiator is higher than the redox potential of $I_2/I^-$ (iodine molecule/iodide ion).

Specific examples of the radical polymerization initiator in an embodiment of the present invention mainly include azo polymerization initiators such as 2,2'-azobisisobutyronitrile (AIBN), 2,2'-azobis-(2-methylpropanenitrile), 2,2'-azobis-(2,4-dimethylpentanenitrile), 2,2'-azobis-(2-methylbutanenitrile), 1,1'-azobis-(cyclohexanecarbonitrile), 2,2'-azobis-(2,4-dimethyl-4-methoxyvaleronitrile), and 2,2'-azobis-(2,4-dimethylvaleronitrile). Organic peroxide polymerization initiators having a redox potential lower than the redox potential of $I_2/I^-$ (iodine molecule/iodide ion) may also be used in an embodiment of the present invention. Specific examples of the organic peroxide polymerization initiators include alkyl peroxy esters such as t-butyl peroxy pivalate and t-butyl-peroxy-2-ethyl hexanoate. Photoradical polymerization initiators such as acetophenones and ketals may also be used. However, the radical polymerization initiator is not limited to the above polymerization initiators. These radical polymerization initiators may be used alone or as a mixture of two or more initiators, as required.

The radical polymerization initiator may be additionally added at a timing of the suspension step 1 in FIG. 2 and subsequent steps.

[Second Liquid Mixture]

The second liquid mixture according to an embodiment of the present invention is a liquid containing water, an iodide ion ($I^-$), and an iodine molecule ($I_2$).

In the second liquid mixture according to an embodiment of the present invention, a triiodide ion ($I_3^-$) is produced on the basis of an equilibrium reaction between an iodide ion and an iodine molecule, as described above. The reason why a large amount of iodine molecules, which originally have a low solubility in water, become soluble in water under the coexistence of iodide ions is derived from this equilibrium reaction.

An example of a method for preparing the second liquid mixture according to an embodiment of the present invention is a method including dissolving an iodide salt in water to prepare an aqueous solution, and adding solid iodine molecules to the aqueous solution. However, the method for preparing the second liquid mixture is not limited thereto.

Common water-soluble iodide salts can be used as the material of the iodide ion contained in the second liquid mixture according to an embodiment of the present invention. Examples of the iodide salt include, but are not limited to, alkali (alkaline earth) metal iodide salts such as potassium iodide, sodium iodide, magnesium iodide, calcium iodide, cesium iodide, and barium iodide; and ammonium iodide salts such as ammonium iodide, tetramethyl ammonium iodide, and acetylcholine iodide. These iodide salts may be used alone or as a mixture of two or more iodide salts, as required.

The sum of the content of the iodide ion and the content of the triiodide ion in the second liquid mixture in an embodiment of the present invention is preferably $5 \times 10^{-2}$ mol/L or more and 5 mol/L or less, and more preferably $1 \times 10^{-1}$ mol/L or more and 1 mol/L or less. If the sum of the content of the iodide ion and the content of the triiodide ion in the second liquid mixture is less than $5 \times 10^{-2}$ mol/L, the hydrolysis reaction of an iodine molecule is not sufficiently suppressed. If the sum of the content of the iodide ion and the content of the triiodide ion in the second liquid mixture exceeds 5 mol/L, dispersibility of a suspension may be degraded, which is not preferable.

[Iodine Compound]

The iodine compound in an embodiment of the present invention is produced by a reaction between a radical generated by cleavage of the radical polymerization initiator of an embodiment of the present invention and an iodine molecule. The iodine compound according to an embodiment of the present invention will now be described with reference to FIGS. 5A and 5B.

Figure 5A:
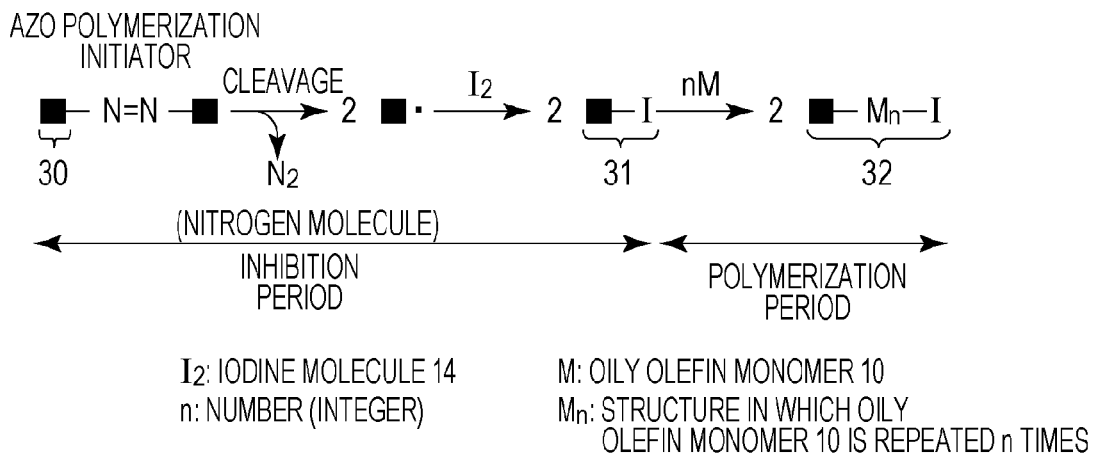
FIGS. 5A and 5B are drawings each illustrating a production mechanism of an iodine compound in reverse iodine transfer polymerization.
Figure 5B:
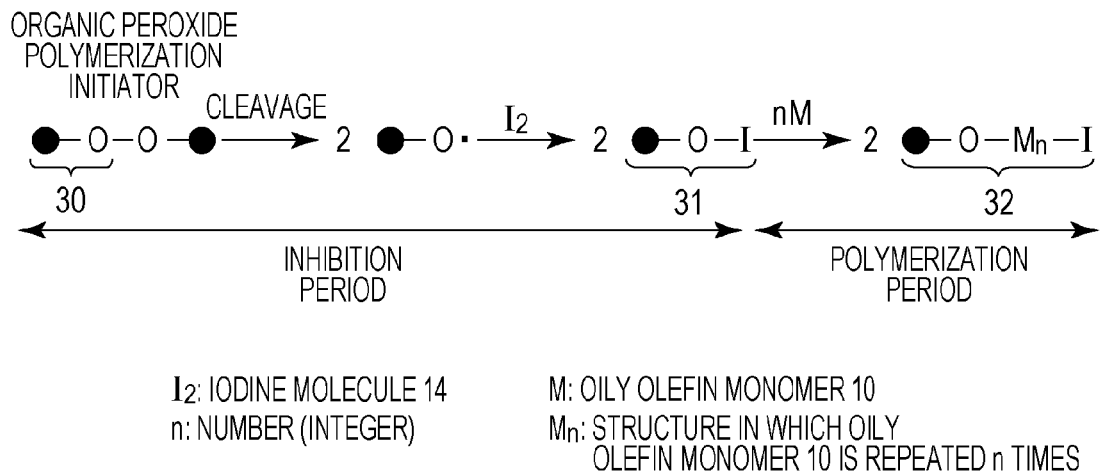

FIGS. 5A and 5B are drawings each illustrating a production mechanism of an iodine compound in reverse iodine transfer polymerization. FIG. 5A illustrates a case where azo polymerization initiators are used as the radical polymerization initiator 11, and FIG. 5B illustrates a case where organic peroxide polymerization initiators are used as the radical polymerization initiator 11. As illustrated in FIGS. 5A and 5B, an iodine compound 31 is produced by a reaction between an iodine molecule and a radical having a chemical structure of a residue 30 generated by cleavage of a radical polymerization initiator 11. That is, the iodine compound 31 has a chemical structure in which an iodine atom is directly bonded to the residue 30. Alternatively, the iodine compound may have a chemical structure in which an iodine atom is directly bonded to a derivative of the residue 30, the derivative being generated by further cleavage of a radical having the chemical structure of the residue 30. Furthermore, an oligomer 32 in which an oily olefin monomer 10 is interposed between the residue 30 and an iodine atom may be mixed as an iodine compound 16. In general, since the iodine compound has lipophilicity significantly higher than that of iodine molecules, the iodine compound remains in the oil droplets in the suspension.

Suspension Step

The suspension step in an embodiment of the present invention is a step of suspending a first liquid mixture containing an oily olefin monomer and a radical polymerization initiator in a second liquid mixture containing water, an iodide ion, and an iodine molecule to prepare a suspension in which oil droplets containing the first liquid mixture are dispersed in the second liquid mixture.

The suspension is obtained by mixing at least water with the first liquid mixture, and incorporating an iodide ion and an iodine molecule in the water.

A known stirring and shearing device can be used as a mixing device. The suspension can be prepared by providing mechanical energy using, for example, a high-shear homomixer, an ultrasonic homogenizer, a high-pressure homogenizer, or a thin-film rotating high-speed mixer. As a mixing method, it is possible to use a known method for obtaining a suspension on the basis of a surface-chemical mechanism, such as a membrane emulsification method using a shirasu porous glass (SPG) membrane, or a microreactor in a microchannel emulsification method, a branched microchannel emulsification method, or the like. These methods may be used alone or in combination of two or more methods.

The timing at which an iodide ion and an iodine molecule are incorporated in water to prepare the second liquid mixture may be any timing of before, during, and after the mixing of the first liquid mixture and water. The iodide ion and the iodine molecule may be incorporated at the same timing or may be separately incorporated at a plurality of timings.

In the suspension step according to an embodiment of the present invention, a dispersant may be incorporated in water in order to improve dispersion stability of the suspension. The dispersant may be incorporated at any timing of before the suspension step, during the suspension step, and after the suspension step. However, the dispersant is preferably incorporated before the suspension step or during the suspension step. In an embodiment of the present invention, known dispersants can be used. Examples of the dispersant include anionic low-molecular-weight surfactants, cationic low-molecular-weight surfactants, nonionic low-molecular weight surfactants, anionic polymer dispersants, cationic polymer dispersants, nonionic polymer dispersants, and inorganic dispersants. Among these dispersants, inorganic dispersants may be incorporated because they have a high effect of improving dispersion stability based on a blocking action and exhibit good stability against a temperature change.

Furthermore, the use of inorganic dispersants may be provided from the standpoint that polymer particles, which are target substances, can be easily isolated and purified. Examples of the inorganic dispersant include, but are not limited to, polyvalent metal salts of phosphoric acid, such as calcium phosphate, tricalcium phosphate, magnesium phosphate, aluminum phosphate, and zinc phosphate; carbonates such as calcium carbonate and magnesium carbonate; inorganic salts such as calcium metasilicate, calcium sulfate, and barium sulfate; calcium hydroxide; magnesium hydroxide; aluminum hydroxide; silica; bentonite; and alumina.

These dispersants may be used alone or in combination of two or more dispersants. In addition, a chemical substance other than the dispersant may be added to water before the suspension step, during the suspension step, or after the suspension step.

In the method disclosed in Non-Patent Document 4, since an excessive amount of hydrochloric acid is added to water, in particular, the dispersion-stabilizing performances of anionic low-molecular-weight surfactants, anionic polymer dispersants, and inorganic dispersants are degraded. Accordingly, this method may be disadvantageous as a method for producing polymer particles. In contrast, in an embodiment of the present invention, any dispersant can be satisfactorily used, and thus the method according to an embodiment of the present invention is advantageous as a method for producing polymer particles.

Synthesis Step

The synthesis step in an embodiment of the present invention is a step of synthesizing an iodine compound by allowing a radical generated from a radical polymerization initiator to react with an iodine molecule in an oil droplet containing the first liquid mixture, the oil droplet being dispersed in the second liquid mixture. The synthesis step corresponds to the inhibition period of reverse iodine transfer polymerization. As a method for inducing the inhibition period, a known method such as heating, light irradiation, or addition of a reducing agent may be used. Among these methods, heating may be performed from the standpoint of good workability and controllability of the reaction. In the case where the reaction is induced by heating, the heating is preferably performed in the range of a 10-hour half-life temperature of the radical polymerization initiator or higher and 40° C. higher than the 10-hour half-life temperature or lower. The heating is more preferably performed in the range of the 10-hour half-life temperature of the radical polymerization initiator or higher and 30° C. higher than the 10-hour half-life temperature or lower. When the heating is performed at a temperature higher than a temperature that is 40° C. higher than the 10-hour half-life temperature, controllability of the reaction may become significantly degraded. When the heating is performed at a temperature lower than the 10-hour half-life temperature, the operation time for the synthesis step can become very long. Thus, heating at a temperature lower than the 10-hour half-life temperature may not be performed from the standpoint of controllability of the reaction and the operating efficiency. A plurality of methods may be used in combination as a method for inducing the inhibition period. The method for inducing the inhibition period of reverse iodine transfer polymerization according to an embodiment of the present invention may be performed in an atmosphere of an inert gas such as argon gas or nitrogen gas.

Polymerization Step

The polymerization step in an embodiment of the present invention is a step of inducing the polymerization period of reverse iodine transfer polymerization in an oil droplet containing the first liquid mixture, the oil droplet being dispersed in water, to obtain polymer particles.

A method for inducing the polymerization period of reverse iodine transfer polymerization is the same as a common method for inducing radical polymerization. Specifically, a known method such as heating, light irradiation, or addition of a reducing agent can be used. Among these methods, heating may be performed from the standpoint of good workability and controllability of a reaction. In the case where the polymerization period is induced by heating, the heating is preferably performed in the range of a 10-hour half-life temperature of the radical polymerization initiator or higher and 40° C. higher than the 10-hour half-life temperature or lower. The heating is more preferably performed in the range of the 10-hour half-life temperature of the radical polymerization initiator or higher and 30° C. higher than the 10-hour half-life temperature or lower. When the heating is performed at a temperature higher than a temperature that is 40° C. higher than the 10-hour half-life temperature, controllability of the polymerization reaction may become significantly degraded. Heating at a temperature of higher than 100° C. may not be provided because the water of the suspension may boil. When the heating is performed at a temperature lower than the 10-hour half-life temperature, the operation time for the polymerization step can become very long. Thus, heating at a temperature lower than the 10-hour half-life temperature may not be performed from the standpoint of controllability of the polymerization reaction and the operating efficiency. In the polymerization step according to an embodiment of the present invention, the heating temperature may be increased or decreased. A plurality of methods may be used in combination as a method for inducing the polymerization period of reverse iodine transfer polymerization. The method for inducing the polymerization period of reverse iodine transfer polymerization according to an embodiment of the present invention may be performed in an atmosphere of an inert gas such as argon gas or nitrogen gas.

Furthermore, in the polymerization step according to an embodiment of the present invention, polymer particles containing a gradient copolymer or a block copolymer can be obtained by combining a plurality of steps. In particular, in order to obtain polymer particles containing a block copolymer, the polymerization step may be conducted in multiple stages. Specifically, the polymerization step may include a first polymerization step of polymerizing an oily olefin monomer in an oil droplet in a suspension, and a second polymerization step of adding a dispersion containing another oily olefin monomer and a radical polymerization initiator to the suspension and conducting polymerization.

In an embodiment of the present invention, a molar ratio of the radical polymerization initiator to an iodine molecule, i.e., [radical polymerization initiator (mol/L)]/[iodine molecule (mol/L)] is preferably more than 1 and 20 or less. The molar ratio is more preferably 1.2 or more and 10 or less. In the case where the molar ratio is 1 or less, the polymerization reaction terminates, and thus it is difficult to achieve a good polymerization conversion rate. On the other hand, in the case where the molar ratio exceeds 20, a chain reaction of the monomer without intervention of an iodine compound occurs as a side reaction, and thus it is difficult to achieve good molecular-weight controllability. A molar ratio of the oily olefin monomer to an iodine molecule, i.e., [oily olefin monomer]/[iodine molecule] can be appropriately changed.

[Second Method for Producing Polymer Particles]

A second method for producing polymer particles according to an embodiment of the present invention includes a suspension step of suspending a first liquid mixture containing an oily olefin monomer and a radical polymerization initiator in water and subsequently adding an iodide ion and an iodine molecule to the water to prepare a suspension in which an oil droplet containing the oily olefin monomer and the radical polymerization initiator is dispersed in the water containing the iodide ion and the iodine molecule; a synthesis step of synthesizing an iodine compound by allowing a radical generated by cleavage of the radical polymerization initiator to react with the iodine molecule in the oil droplet; and a polymerization step of polymerizing the oily olefin monomer in the oil droplet.

The second method for producing polymer particles according to an embodiment of the present invention differs from the first method for producing polymer particles according to an embodiment of the present invention in the suspension step of preparing a suspension in which an oil droplet is dispersed. The synthesis step and the polymerization step of the second method for producing polymer particles are the same as those of the first method for producing polymer particles.

The suspension step of the second method for producing polymer particles will be described below. The suspension step includes suspending a first liquid mixture containing an oily olefin monomer and a radical polymerization initiator in water, and subsequently adding an iodide ion and an iodine molecule to the water.

FIG. 6 is a process drawing illustrating the second method for producing polymer particles according to an embodiment of the present invention. Referring to FIG. 6, in a suspension step 1, a first liquid mixture containing an oily olefin monomer 10 and a radical polymerization initiator 11 is suspended in water 13, thereby obtaining a suspension 1. Next, iodide ions 12 and iodine molecules 14 are added to the water in the suspension 1. Thus, the resulting suspension 1 in which oil droplets 15 containing the oily olefin monomer 10 and the radical polymerization initiator 11 are dispersed in the water 13 containing the iodide ions 12 and the iodine molecules 14 is obtained. The sum of the content of the iodide ion and the content of the triiodide ion in the suspension 1 is preferably $5 \times 10^{-2}$ mol/L or more and 5 mol/L or less, and more preferably $1 \times 10^{-1}$ mol/L or more and 1 mol/L or less.

Next, in a synthesis step 1, the inhibition period of reverse iodine transfer polymerization occurs in the oil droplets 15, and radicals generated by cleavage of the radical polymerization initiator 11 and the iodine molecules 14 react with each other to produce an iodine compound 16, thus obtaining a suspension 2 in which oil droplets 17 containing the iodine compound 16 are dispersed in the water 13. Lastly, in a polymerization step 1, the polymerization period of reverse iodine transfer polymerization occurs in the oil droplets 17, and the oily olefin monomer 10 is polymerized, thereby obtaining an aqueous dispersion 1 in which polymer particles 18 are dispersed in the water 13.

[Method for Collecting Polymer Particles]

Polymer particles obtained by the method according to an embodiment of the present invention can be collected from the aqueous dispersion of polymer particles obtained in the polymerization step by solid-liquid separation using a method such as decantation, filtration, or centrifugal separation. The method for collecting the polymer particles is not limited thereto, and other known methods may also be used. These methods may be used alone or in combination of two or more methods.

[Polymer Particles]

The particle size of the polymer particles according to an embodiment of the present invention can be appropriately adjusted by changing, for example, the suspension method in the suspension step, or the type or amount of dispersant used. The particle size of the polymer particles is not particularly limited. However, the number-average particle size of the polymer particles is preferably 300 μm or less, in particular, 20 nm or more and 100 μm or less, and more preferably 50 nm or more and 50 μm or less.

The polymer particles according to an embodiment of the present invention contain a polymer compound having an iodine atom at an end of a polymer chain. Such an iodine atom at an end can be identified by nuclear magnetic resonance (NMR) spectroscopy or the like. For example, an iodine atom bonded to an end of a polystyrene chain prepared on the basis of an embodiment of the present invention can be identified by detecting a signal (at 4 to 5 ppm in deuterochloroform) of a proton adjacent to the iodine atom by $^1$H NMR spectroscopy.

EXAMPLES

Examples of a method for producing polymer particles according to an embodiment of the present invention will now be described. However, the present invention is not limited to these Examples.

Method for Measuring Particle Size

Regarding a particle size of polymer particles, the number-average particle size was measured with a precise particle size distribution analyzer using a pore electrical resistance method "Coulter Counter Multisizer 3" (registered trademark, manufactured by Beckman Coulter, Inc.). In the measurement, "ISOTON II" (manufactured by Beckman Coulter, Inc.) was used as an electrolyte aqueous solution. On the other hand, regarding polymer particles having a particle size of less than 1 μm, the number-average particle size was measured with a precise particle size distribution analyzer using a dynamic light scattering method "DLS8000" (manufactured by Otsuka Electronics Co., Ltd.).

Method for Measuring Polymerization Conversion Rate

A polymerization conversion rate was determined on the basis of a calibration curve method from the amount of oily olefin monomer consumed in the polymerization step, the amount being measured by gas chromatography (apparatus: manufactured by Agilent Technologies, column: HP-5 manufactured by Agilent Technologies).

Measurement of Molecular Weight

Regarding molecular weights, the number-average molecular weight ($M_n$), the weight-average molecular weight ($M_w$), and the peak molecular weight ($M_p$) were measured by gel permeation chromatography (apparatus: HLC-8121GPC/HT, manufactured by Tosoh Corporation, column: TSKgel G2000H$_{XL}$/G3000H$_{XL}$/G4000H$_{XL}$, manufactured by Tosoh Corporation).

Evaluation of Molecular-Weight Controllability

Molecular-weight controllability was evaluated as follows with reference to Non-Patent Document 3. At a polymerization conversion rate of 90% or more, a peak molecular weight ($M_{p, suspension}$) in the case where reverse iodine transfer polymerization was combined with suspension polymerization was compared with a peak molecular weight ($M_{p, bulk}$) in the case where reverse iodine transfer polymerization was conducted by bulk polymerization. More specifically, when a ratio $M_{p, suspension}/M_{p, bulk}$ was in the range of 0.9 to 1.1, the molecular-weight controllability was evaluated as "good" and denoted by "A". When the ratio $M_{p, suspension}/M_{p, bulk}$ was out of the above range, the molecular-weight controllability was evaluated as "poor" and denoted by "B". When the evaluation could not be conducted, the evaluation result of the molecular-weight controllability was denoted by "-".

Example 1

Suspension Step

In a 100-mL glass container, 8.4 mmol of 2,2'-azobis-(2,4-dimethylvaleronitrile) (V-65; manufactured by Wako Pure Chemical Industries, Ltd., azo radical polymerization initiator, 10-hour half-life temperature: 51° C.) and 0.54 mol of styrene were uniformly mixed. Thus, a first liquid mixture was obtained. To 200 g of ion-exchanged water, 2.2 g of tricalcium phosphate (inorganic dispersant) was added, and the resulting mixture was stirred at 15,000 rpm for 30 minutes to prepare a dispersion at 30° C. Next, 0.02 mol of potassium iodide was dissolved in the dispersion and 2.8 mmol of iodine molecules were then added thereto to prepare a second liquid mixture (pH 8 to 9). The amount of iodide ion added to the second liquid mixture was $1 \times 10^{-1}$ mol/L in terms of the amount of potassium iodide.

Next, the first liquid mixture was poured into the second liquid mixture in a nitrogen atmosphere at one time. The mixture was stirred at 15,000 rpm for 10 minutes in a nitrogen atmosphere, and the stirring was then stopped. Thus, an orange suspension was obtained.

[Synthesis Step and Polymerization Step]

The suspension was heated to 70° C. with a water bath while stirring at 200 rpm in a nitrogen atmosphere using a mechanical stirrer. After the start of the heating, the orange color of the suspension gradually became light, and changed to white after about 30 minutes. This change in the color from orange to white shows that, in the inhibition period, iodine molecules in the suspension reacted with radicals generated by cleavage of V-65 to form an iodine compound. During this period, a polymerization reaction of the monomer hardly occurred, and the conversion rate was 0%.

A polymerization step was subsequently conducted. The white suspension was heated to 70° C. with a water bath in a nitrogen atmosphere. The suspension after six hours from the start of the heating was sampled, and the particle size (number-average particle size), the polymerization conversion rate, the peak molecular weight ($M_{p, suspension}$), and the molecular-weight distribution ($M_w/M_n$) of the resulting polymer particles were measured. The molecular-weight controllability was evaluated by a comparison with the peak molecular weight ($M_{p, bulk}$) in Reference Example 1. The results are summarized in Table 1.

Example 2

Polymer particles were obtained as in Example 1 except that 0.54 mol of styrene in Example 1 was changed to 0.56 mol of methyl methacrylate. A suspension after six hours from the start of heating in the polymerization step was sampled, and the particle size, the polymerization conversion rate, the peak molecular weight ($M_{p, suspension}$), and the molecular-weight distribution ($M_w/M_n$) of the resulting polymer particles were measured. The molecular-weight controllability was evaluated by a comparison with the peak molecular weight ($M_{p,\,bulk}$) in Reference Example 2. The results are summarized in Table 1.

Example 3

Polymer particles were obtained as in Example 1 except that 0.54 mol of styrene in Example 1 was changed to 0.43 mol of styrene and 0.11 mol of methyl methacrylate. A suspension after seven hours from the start of heating in the polymerization step was sampled, and the particle size, the polymerization conversion rate, the peak molecular weight ($M_{p,\,suspension}$), and the molecular-weight distribution ($M_w/M_n$) of the resulting polymer particles were measured. The molecular-weight controllability was evaluated by a comparison with the peak molecular weight ($M_{p,\,bulk}$) in Reference Example 3. The results are summarized in Table 1.

Example 4

Polymer particles were obtained as in Example 1 except that, in Example 1, 8.4 mmol of V-65 was changed to 8.4 mmol of 2,2'-azobisisobutyronitrile (AIBN) (azo polymerization initiator, 10-hour half-life temperature: 65° C.), and the heating temperature in the synthesis step and the polymerization step was changed from 70° C. to 80° C. A suspension after six hours from the start of heating in the polymerization step was sampled, and the particle size, the polymerization conversion rate, the peak molecular weight ($M_{p,\,suspension}$), and the molecular-weight distribution ($M_w/M_n$) of the resulting polymer particles were measured. The molecular-weight controllability was evaluated by a comparison with the peak molecular weight ($M_{p,\,bulk}$) in Reference Example 4. The results are summarized in Table 1.

Example 5

Polymer particles were obtained as in Example 2 except that, in Example 2, 8.4 mmol of V-65 was changed to 8.4 mmol of AIBN, and the heating temperature in the synthesis step and the polymerization step was changed from 70° C. to 80° C. A suspension after seven hours from the start of heating in the polymerization step was sampled, and the particle size, the polymerization conversion rate, the peak molecular weight ($M_{p,\,suspension}$), and the molecular-weight distribution ($M_w/M_n$) of the resulting polymer particles were measured. The molecular-weight controllability was evaluated by a comparison with the peak molecular weight ($M_{p,\,bulk}$) in Reference Example 5. The results are summarized in Table 1.

Example 6

Polymer particles were obtained as in Example 3 except that, in Example 3, 8.4 mmol of V-65 was changed to 8.4 mmol of AIBN, and the heating temperature in the synthesis step and the polymerization step was changed from 70° C. to 80° C. A suspension after seven hours from the start of heating in the polymerization step was sampled, and the particle size, the polymerization conversion rate, the peak molecular weight ($M_{p,\,suspension}$), and the molecular-weight distribution ($M_w/M_n$) of the resulting polymer particles were measured. The molecular-weight controllability was evaluated by a comparison with the peak molecular weight ($M_{p,\,bulk}$) in Reference Example 6. The results are summarized in Table 1.

Example 7

Polymer particles were obtained as in Example 1 except that the amount of potassium iodide in the second liquid mixture in Example 1 was changed from 0.02 mol to 0.01 mol (the content of iodide ion in the second liquid mixture was changed to $5 \times 10^{-2}$ mol/L in terms of the amount of potassium iodide). A suspension after seven hours from the start of heating in the polymerization step was sampled, and the particle size, the polymerization conversion rate, the peak molecular weight ($M_{p,\,suspension}$), and the molecular-weight distribution ($M_w/M_n$) of the resulting polymer particles were measured. The molecular-weight controllability was evaluated by a comparison with the peak molecular weight ($M_{p,\,bulk}$) in Reference Example 1. The results are summarized in Table 1.

Example 8

Polymer particles were obtained as in Example 1 except that the amount of potassium iodide in the second liquid mixture in Example 1 was changed from 0.02 mol to 0.2 mol (the content of iodide ion in the second liquid mixture was changed to 1 mol/L in terms of the amount of potassium iodide). A suspension after seven hours from the start of heating in the polymerization step was sampled, and the particle size, the polymerization conversion rate, the peak molecular weight ($M_{p,\,suspension}$), and the molecular-weight distribution ($M_w/M_n$) of the resulting polymer particles were measured. The molecular-weight controllability was evaluated by a comparison with the peak molecular weight ($M_{p,\,bulk}$) in Reference Example 1. The results are summarized in Table 1.

Example 9

Suspension Step

In a 100-mL glass container, 8.4 mmol of 2,2'-azobis-(2,4-dimethylvaleronitrile) (V-65; manufactured by Wako Pure Chemical Industries, Ltd., azo radical polymerization initiator, 10-hour half-life temperature: 51° C.) and 0.54 mol of styrene were uniformly mixed. Thus, a first liquid mixture was obtained. To 200 g of ion-exchanged water, 2.2 g of tricalcium phosphate (inorganic dispersant) was added, and the resulting mixture was stirred at 15,000 rpm for 30 minutes to prepare a dispersion of the inorganic dispersant.

Next, the first liquid mixture was poured into the dispersion (30° C.) of the inorganic dispersant in a nitrogen atmosphere at one time. The mixture was stirred at 15,000 rpm for 10 minutes in a nitrogen atmosphere, and the stirring was then stopped. Thus, a white first suspension was obtained. Subsequently, 0.02 mol of potassium iodide was dissolved in the first suspension and 2.8 mmol of iodine molecules were then added thereto. Thus, an orange second suspension in which oil droplets containing the first liquid mixture are dispersed in a second liquid mixture (pH 8 to 9) containing the water, iodide ions, and iodine molecules was prepared. The amount of iodide ion added to the second liquid mixture was $1 \times 10^{-1}$ mol/L in terms of the amount of potassium iodide.

[Synthesis Step and Polymerization Step]

The second suspension was heated to 70° C. with a water bath while stirring at 200 rpm in a nitrogen atmosphere using a mechanical stirrer. After the start of the heating, the orange color of the second suspension gradually became light, and changed to white after about 30 minutes. This change in the color from orange to white shows that, in the inhibition period, iodine molecules in the second suspension reacted with radicals generated by cleavage of V-65 to form an iodine compound. During this period, a polymerization reaction of the monomer hardly occurred, and the conversion rate was 0%.

A polymerization step was subsequently conducted. The white suspension was heated to 70° C. with a water bath in a nitrogen atmosphere. The suspension after six hours from the start of the heating was sampled, and the particle size (number-average particle size), the polymerization conversion rate, the peak molecular weight ($M_{p,\ suspension}$), and the molecular-weight distribution ($M_w/M_n$) of the resulting polymer particles were measured. According to the results, the particle size was 4.4 μm, the polymerization conversion rate was 96%, the peak molecular weight ($M_{p,\ suspension}$) was 11,400, and the molecular-weight distribution ($M_w/M_n$) was 1.4. The peak molecular weight ($M_{p,\ suspension}$) of Example 9 was compared with the peak molecular weight ($M_{p,\ bulk}$) in Reference Example 1. The ratio $M_{p,\ suspension}/M_{p,\ bulk}$ was in the range of 0.9 to 1.1. Thus, it was considered that the molecular-weight controllability of Example 9 was good.

Example 10

Polymer particles were obtained as in Example 1 except that 0.07 mmol of N-iodosuccinimide was added as a functional substance to the first liquid mixture in Example 1. A suspension after seven hours from the start of heating in the polymerization step was sampled, and the particle size, the polymerization conversion rate, the peak molecular weight ($M_{p,\ suspension}$), and the molecular-weight distribution ($M_w/M_n$) of the resulting polymer particles were measured. The results obtained from this sample were substantially the same as those of Example 1. On the other hand, a suspension after two hours from the start of heating in the polymerization step was sampled, and the polymerization conversion rate was measured. The polymerization conversion rate was 70%. This value was higher than 63%, which was a polymerization conversion rate in Example 1 at the same heating time. Thus, it was confirmed that the rate of polymerization was improved by adding N-iodosuccinimide.

Example 11

Suspension Step

In a 100-mL glass container, 8.4 mmol of 2,2'-azobis-(2, 4-dimethylvaleronitrile) (V-65; manufactured by Wako Pure Chemical Industries, Ltd., azo radical polymerization initiator, 10-hour half-life temperature: 51° C.), 0.20 mol of butyl acrylate, and 20 g of toluene were uniformly mixed. Thus, a first liquid mixture was obtained. To 200 g of ion-exchanged water, 2.2 g of tricalcium phosphate (inorganic dispersant) was added, and the resulting mixture was stirred at 15,000 rpm for 30 minutes to prepare a dispersion at 30° C. Next, 0.02 mol of potassium iodide was dissolved in the dispersion and 2.8 mmol of iodine molecules were then added thereto to prepare a second liquid mixture (pH 8 to 9). The amount of iodide ion added to the second liquid mixture was $1\times10^{-1}$ mol/L in terms of the amount of potassium iodide.

Next, the first liquid mixture was poured into the second liquid mixture in a nitrogen atmosphere at one time. The mixture was stirred at 15,000 rpm for 10 minutes in a nitrogen atmosphere, and the stirring was then stopped. Thus, an orange suspension was obtained.
[Synthesis Step and Polymerization Step]

The suspension was heated to 70° C. with a water bath while stirring at 200 rpm in a nitrogen atmosphere using a mechanical stirrer. After the start of the heating, the orange color of the suspension gradually became light, and changed to white after about 30 minutes. This change in the color from orange to white shows that, in the inhibition period, iodine molecules in the suspension reacted with radicals generated by cleavage of V-65 to form an iodine compound. During this period, a polymerization reaction of the monomer hardly occurred, and the conversion rate was 0%.

Subsequently, a first polymerization step was conducted. The white suspension was heated to 70° C. with a water bath in a nitrogen atmosphere. A suspension 1 after four hours from the start of the heating was sampled.

Subsequently, a second polymerization step was conducted. A solution prepared by dissolving 2.0 mmol of V-65 in 0.34 mol of styrene was finely dispersed in 100 g of water using an ultrasonic homogenizer to prepare a dispersion. This dispersion was charged in the suspension 1, and the resulting mixture was further heated at 70° C. for 12 hours and then sampled as a suspension 2.

The polymerization conversion rate, the peak molecular weight ($M_{p,\ suspension}$), and the molecular-weight distribution ($M_w/M_n$) of the polymer particles in the suspension 1 were measured. According to the results, the polymerization conversion rate was 100%, the peak molecular weight ($M_{p,\ suspension}$) was 4,800, and the molecular-weight distribution ($M_w/M_n$) was 1.8. The polymerization conversion rate, the peak molecular weight ($M_{p,\ suspension}$), and the molecular-weight distribution ($M_w/M_n$) of the polymer particles in the suspension 2 were measured. According to the results, the polymerization conversion rate was 92%, the peak molecular weight ($M_{p,\ suspension}$) was 10,400, and the molecular-weight distribution ($M_w/M_n$) was 1.6.

From the above results, it was considered that polymer particles containing a block copolymer composed of butyl acrylate and styrene could be prepared.

Example 12

Suspension Step

In a 100-mL glass container, 8.4 mmol of 2,2'-azobis-(2, 4-dimethylvaleronitrile) (V-65; manufactured by Wako Pure Chemical Industries, Ltd., azo radical polymerization initiator, 10-hour half-life temperature: 51° C.), 0.54 mol of styrene, and 0.034 mol of hexadecane were uniformly mixed. Thus, a first liquid mixture was obtained. To 90 g of ion-exchanged water, 4.7 mmol of sodium dodecyl sulfate was added to prepare a dispersion at 30° C. Next, 9.0 mmol of potassium iodide was dissolved in the dispersion and 2.8 mmol of iodine molecules were then added thereto to prepare a second liquid mixture (pH 8 to 9). The amount of iodide ion added to the second liquid mixture was $1\times10^{-1}$ mol/L in terms of the amount of potassium iodide.

Next, the second liquid mixture and the first liquid mixture were mixed in a nitrogen atmosphere, and the resulting mixture was treated with an ultrasonic homogenizer of 300 W at 4° C. for ten minutes in a nitrogen atmosphere. Thus, an orange suspension was obtained.
[Synthesis Step and Polymerization Step]

The suspension was heated to 70° C. with a water bath while stirring at 200 rpm in a nitrogen atmosphere using a mechanical stirrer. After the start of the heating, the orange color of the suspension gradually became light, and changed to white after about 30 minutes. This change in the color from orange to white shows that, in the inhibition period, iodine molecules in the suspension reacted with radicals generated by cleavage of V-65 to form an iodine compound. During this period, a polymerization reaction of the monomer hardly occurred, and the conversion rate was 0%.

A polymerization step was subsequently conducted. The white suspension was heated to 70° C. with a water bath in a nitrogen atmosphere. The suspension after six hours from the start of the heating was sampled, and the particle size (number-average particle size), the polymerization conversion rate, the peak molecular weight ($M_{p,\ suspension}$), and the molecular-weight distribution ($M_w/M_n$) of the resulting polymer particles were measured. According to the results, the particle size was 193 nm, the polymerization conversion rate was 95%, the peak molecular weight ($M_{p,\ suspension}$) was 10,800, and the molecular-weight distribution ($M_w/M_n$) was 1.5. The peak molecular weight ($M_{p,\ suspension}$) of Example 12 was compared with the peak molecular weight ($M_{p,\ bulk}$) in Reference Example 1. The ratio $M_{p,\ suspension}/M_{p,\ bulk}$ was in the range of 0.9 to 1.1. Thus, it was considered that the molecular-weight controllability of Example 12 was good.

Reference Example 1

Reference Examples described below are examples in which bulk polymerization was used in a polymerization reaction. Bulk polymerization is a polymerization reaction that occurs in a single oil droplet. In other words, bulk polymerization can be considered to be a reaction in only a single oil droplet of suspension polymerization. Therefore, a suspension polymerization in which bulk polymerization is collectively performed is considered to be an ideal suspension polymerization.

Accordingly, in Reference Examples described below, whether data of Examples described above is ideal data or not is determined by comparing data of bulk polymerization with data of corresponding Example.

In a 100-mL glass container, 8.4 mmol of V-65, 2.8 mmol of iodine molecules, and 0.54 mol of styrene were charged and uniformly mixed. Thus, a dark purple-red liquid mixture was obtained. Nitrogen gas was bubbled through the liquid mixture in an ice bath at a flow rate of 200 mL/min for 30 minutes to remove oxygen dissolved in the liquid mixture, and the liquid mixture was then heated to 70° C. with a water bath in a nitrogen atmosphere. A polymer compound was obtained after six hours from the start of the heating. The polymerization conversion rate, the peak molecular weight ($M_{p,\ bulk}$), and the molecular-weight distribution ($M_w/M_n$) of the polymer compound were measured. The results are summarized in Table 1.

Reference Example 2

A polymer compound was obtained as in Reference Example 1 except that 0.54 mol of styrene in Reference Example 1 was changed to 0.56 mol of methyl methacrylate. The polymerization conversion rate, the peak molecular weight ($M_{p,\ bulk}$), and the molecular-weight distribution ($M_w/M_n$) of the polymer compound obtained after six hours from the start of heating were measured. The results are summarized in Table 1.

Reference Example 3

A polymer compound was obtained as in Reference Example 1 except that 0.54 mol of styrene in Reference Example 1 was changed to 0.43 mol of styrene and 0.11 mol of methyl methacrylate. The polymerization conversion rate, the peak molecular weight ($M_{p,\ bulk}$), and the molecular-weight distribution ($M_w/M_n$) of the polymer compound obtained after six hours from the start of heating were measured. The results are summarized in Table 1.

Reference Example 4

A polymer compound was obtained as in Reference Example 1 except that, in Reference Example 1, 8.4 mmol of V-65 was changed to 8.4 mmol of AIBN, and the heating temperature during polymerization was changed from 70° C. to 80° C. The polymerization conversion rate, the peak molecular weight ($M_{p,\ bulk}$), and the molecular-weight distribution ($M_w/M_n$) of the polymer compound obtained after six hours from the start of heating were measured. The results are summarized in Table 1.

Reference Example 5

A polymer compound was obtained as in Reference Example 2 except that, in Reference Example 2, 8.4 mmol of V-65 was changed to 8.4 mmol of AIBN, and the heating temperature during polymerization was changed from 70° C. to 80° C. The polymerization conversion rate, the peak molecular weight ($M_{p,\ bulk}$), and the molecular-weight distribution ($M_w/M_n$) of the polymer compound obtained after six hours from the start of heating were measured. The results are summarized in Table 1.

Reference Example 6

A polymer compound was obtained as in Reference Example 3 except that, in Reference Example 3, 8.4 mmol of V-65 was changed to 8.4 mmol of AIBN, and the heating temperature during polymerization was changed from 70° C. to 80° C. The polymerization conversion rate, the peak molecular weight ($M_{p,\ bulk}$), and the molecular-weight distribution ($M_w/M_n$) of the polymer compound obtained after seven hours from the start of heating were measured. The results are summarized in Table 1.

Comparative Example 1

Suspension Step

In a 100-mL glass container, 8.4 mmol of 2,2'-azobis-(2,4-dimethylvaleronitrile) (V-65; manufactured by Wako Pure Chemical Industries, Ltd., azo radical polymerization initiator, 10-hour half-life temperature: 51° C.), 2.8 mmol of iodine molecules, and 0.54 mol of styrene were uniformly mixed. Thus, a third liquid mixture was obtained. To 200 g of ion-exchanged water, 2.2 g of tricalcium phosphate (inorganic dispersant) was added, and the resulting mixture was stirred at 15,000 rpm for 30 minutes to prepare a dispersion of the inorganic dispersant.

Next, the third liquid mixture was poured into the dispersion (30° C.) of the inorganic dispersant in a nitrogen atmosphere at one time. The mixture was stirred at 15,000 rpm for 10 minutes in a nitrogen atmosphere, and the stirring was then stopped. Thus, a red suspension was obtained.

[Synthesis Step and Polymerization Step]

The suspension was heated to 70° C. with a water bath while stirring at 200 rpm in a nitrogen atmosphere using a mechanical stirrer. After the start of the heating, the red color of the suspension gradually became light, and changed to white after about 30 minutes. This change in the color from red to white shows that iodine molecules in the suspension reacted with radicals generated by cleavage of V-65 to form an iodine compound. During this period, a polymerization reaction of the monomer hardly occurred, and the conversion rate was 0%.

A polymerization step was subsequently conducted. The white suspension was heated to 70° C. with a water bath in a nitrogen atmosphere. The suspension after six hours from the start of the heating was sampled, and the particle size, the polymerization conversion rate, the peak molecular weight ($M_{p,\ suspension}$) and the molecular-weight distribution ($M_w/M_n$) of the resulting polymer particles were measured. The molecular-weight controllability was evaluated by a comparison with the peak molecular weight ($M_{p,\ bulk}$) in Reference Example 1. The results are summarized in Table 1.

Comparative Example 2

Polymer particles were obtained as in Comparative Example 1 except that 0.54 mol of styrene in Comparative Example 1 was changed to 0.56 mol of methyl methacrylate. A suspension after six hours from the start of heating in the polymerization step was sampled, and the particle size, the polymerization conversion rate, the peak molecular weight ($M_{p,\ suspension}$), and the molecular-weight distribution ($M_w/M_n$) of the resulting polymer particles were measured. The molecular-weight controllability was evaluated by a comparison with the peak molecular weight ($M_{p,\ bulk}$) in Reference Example 2. The results are summarized in Table 1.

Comparative Example 3

Polymer particles were obtained as in Comparative Example 1 except that 0.54 mol of styrene in Comparative Example 1 was changed to 0.43 mol of styrene and 0.11 mol of methyl methacrylate. A suspension after six hours from the start of heating in the polymerization step was sampled, and the particle size, the polymerization conversion rate, the peak molecular weight ($M_{p,\ suspension}$), and the molecular-weight distribution ($M_w/M_n$) of the resulting polymer particles were measured. The molecular-weight controllability was evaluated by a comparison with the peak molecular weight ($M_{p,\ bulk}$) in Reference Example 3. The results are summarized in Table 1.

Comparative Example 4

Polymer particles were obtained as in Comparative Example 1 except that, in Comparative Example 1, 8.4 mmol of V-65 was changed to 8.4 mmol of AIBN, and the heating temperature in the synthesis step and the polymerization step was changed from 70° C. to 80° C. A suspension after six hours from the start of heating in the polymerization step was sampled, and the particle size, the polymerization conversion rate, the peak molecular weight ($M_{p,\ suspension}$), and the molecular-weight distribution ($M_w/M_n$) of the resulting polymer particles were measured. The molecular-weight controllability was evaluated by a comparison with the peak molecular weight ($M_{p,\ bulk}$) in Reference Example 4. The results are summarized in Table 1.

Comparative Example 5

Polymer particles were obtained as in Comparative Example 2 except that, in Comparative Example 2, 8.4 mmol of V-65 was changed to 8.4 mmol of AIBN, and the heating temperature in the synthesis step and the polymerization step was changed from 70° C. to 80° C. A suspension after six hours from the start of heating in the polymerization step was sampled, and the particle size, the polymerization conversion rate, the peak molecular weight ($M_{p,\ suspension}$), and the molecular-weight distribution ($M_w/M_n$) of the resulting polymer particles were measured. The molecular-weight controllability was evaluated by a comparison with the peak molecular weight ($M_{p,\ bulk}$) in Reference Example 5. The results are summarized in Table 1.

Comparative Example 6

Polymer particles were obtained as in Comparative Example 3 except that, in Comparative Example 3, 8.4 mmol of V-65 was changed to 8.4 mmol of AIBN, and the heating temperature in the synthesis step and the polymerization step was changed from 70° C. to 80° C. A suspension after six hours from the start of heating in the polymerization step was sampled, and the particle size, the polymerization conversion rate, the peak molecular weight ($M_{p,\ suspension}$), and the molecular-weight distribution ($M_w/M_n$) of the resulting polymer particles were measured. The molecular-weight controllability was evaluated by a comparison with the peak molecular weight ($M_{p,\ bulk}$) in Reference Example 6. The results are summarized in Table 1.

TABLE 1

| | Monomer[Note 1] | Polymerization initiator | Polymerization method | Amount of potassium iodide[Note 2]/ mol/L | Conversion rate/% | Molecular weight: $M_p$ | $M_w/M_n$ | Molecular-weight controllability[Note 3] | Particle size/μm |
|---|---|---|---|---|---|---|---|---|---|
| Example 1 | St | V-65 | Suspension polymerization | $1 \times 10^{-1}$ | 96 | 11,200 | 1.4 | A | 4.0 |
| Example 2 | MMA | | | | 94 | 11,000 | 1.5 | A | 4.5 |
| Example 3 | St/MMA | | | | 96 | 11,400 | 1.4 | A | 3.8 |
| Example 4 | St | AIBN | | | 98 | 11,000 | 1.4 | A | 4.2 |
| Example 5 | MMA | | | | 95 | 10,500 | 1.5 | A | 3.9 |
| Example 6 | St/MMA | | | | 93 | 10,800 | 1.4 | A | 4.2 |
| Example 7 | St | V-65 | | $5 \times 10^{-2}$ | 96 | 11,100 | 1.3 | A | 4.5 |
| Example 8 | | | | 1.0 | 97 | 10,800 | 1.4 | A | 4.0 |
| Reference Example 1 | St | V-65 | Bulk polymerization | 0 | 92 | 10,200 | 1.4 | — | — |
| Reference Example 2 | MMA | | | | 93 | 10,200 | 1.5 | — | — |
| Reference Example 3 | St/MMA | | | | 96 | 10,600 | 1.4 | — | — |
| Reference Example 4 | St | AIBN | | | 95 | 11,000 | 1.3 | — | — |
| Reference Example 5 | MMA | | | | 94 | 10,800 | 1.4 | — | — |

TABLE 1-continued

| | Monomer[Note 1] | Polymerization initiator | Polymerization method | Amount of potassium iodide[Note 2]/ mol/L | Conversion rate/% | Molecular weight: $M_p$ | $M_w/M_n$ | Molecular-weight controllability[Note 3] | Particle size/μm |
|---|---|---|---|---|---|---|---|---|---|
| Reference Example 6 | St/MMA | | | | 96 | 10,300 | 1.4 | — | — |
| Comparative Example 1 | St | V-65 | Suspension polymerization | 0 | 98 | 16,300 | 1.6 | B | 4.5 |
| Comparative Example 2 | MMA | | | | 96 | 16,900 | 1.5 | B | 3.5 |
| Comparative Example 3 | St/MMA | | | | 98 | 16,600 | 1.5 | B | 4.2 |
| Comparative Example 4 | St | AIBN | | | 95 | 15,400 | 1.5 | B | 3.2 |
| Comparative Example 5 | MMA | | | | 96 | 15,800 | 1.4 | B | 3.7 |
| Comparative Example 6 | St/MMA | | | | 95 | 16,000 | 1.5 | B | 4.1 |

[Note 1] St: Styrene, MMA: Methyl methacrylate
[Note 2] The amount of potassium iodide represents the amount of potassium iodide (mol/L) added in preparation of a second liquid mixture, and represents the sum of the content of iodide ion and the content of triiodide ion in the second liquid mixture.
[Note 3] In molecular-weight controllability, symbol "A" represents "good", symbol "B" represents "poor" in a case other than the case of "A", and symbol "—" represents that the evaluation could not be conducted.

The method for producing polymer particles according to an embodiment of the present invention can achieve both good molecular-weight controllability and a good polymerization conversion rate. Accordingly, the method can be used for producing, for example, a polymerized toner or a functional binder contained in an ink-jet ink or the like.

According to embodiments of the present invention, it is possible to provide a method for producing polymer particles, the method being performed by using suspension polymerization and reverse iodine transfer polymerization in combination, in which both good molecular-weight controllability and a good polymerization conversion rate can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-234905 filed Oct. 24, 2012, which is hereby incorporated by reference herein in its entirety.

What is claimed is:

1. A method for producing polymer particles, comprising:
    a suspension step of suspending a first liquid mixture containing an oily olefin monomer and a radical polymerization initiator in water, and subsequently adding an iodide ion and an iodine molecule to the water, to prepare a suspension in which an oil droplet containing the oily olefin monomer and the radical polymerization initiator is dispersed in the water containing the iodide ion and the iodine molecule;
    a synthesis step of synthesizing an iodine compound by allowing a radical generated by cleavage of the radical polymerization initiator to react with the iodine molecule in the oil droplet; and
    a polymerization step of polymerizing the oily olefin monomer in the oil droplet.

2. The method according to claim 1, wherein the polymerization step includes a first polymerization step of polymerizing the oily olefin monomer in the oil droplet in the suspension, and a second polymerization step of adding a dispersion containing another oily olefin monomer and a radical polymerization initiator to the suspension and conducting polymerization.

3. The method according to claim 1, wherein the radical polymerization initiator is an oil-soluble radical polymerization initiator.

4. The method according to claim 1, wherein the radical polymerization initiator is an azo polymerization initiator.

5. The method according to claim 1, wherein the oily olefin monomer includes at least one of styrene, chlorostyrene, α-methylstyrene, divinylbenzene, vinyltoluene, methyl (meth)acrylate, ethyl (meth)acrylate, and butyl (meth)acrylate.

6. The method according to claim 1, wherein the sum of the content of an iodide ion and the content of a triiodide ion in the second liquid mixture is $5 \times 10^{-2}$ mol/L or more and 5 mol/L or less.

* * * * *